United States Patent [19]

Herget

[11] Patent Number: 5,113,707

[45] Date of Patent: May 19, 1992

[54] THREE-DIMENSIONAL STRAIN MONITOR FOR ROCK BOREHOLES

[75] Inventor: Gerhard H. Herget, Kanata, Canada

[73] Assignee: Her Majesty the Queen in right of Canada, Ontario, Canada

[21] Appl. No.: 694,485

[22] Filed: May 2, 1991

[51] Int. Cl.$^5$ .............................................. G01B 7/16
[52] U.S. Cl. ..................................................... 73/784
[58] Field of Search .............. 73/784, DIG. 1, 594, 73/778, 862.41, 862.59

[56] References Cited

U.S. PATENT DOCUMENTS

| 4,813,278 | 3/1989 | Kosugi | 73/783 |
| 4,858,472 | 8/1989 | Herget et al. | 73/784 |

FOREIGN PATENT DOCUMENTS

| 1240851 | 8/1988 | Canada . | |
| 400829 | 4/1974 | U.S.S.R. | 73/784 |

Primary Examiner—Jerry W. Myracle
Attorney, Agent, or Firm—Jones, Tullar & Cooper

[57] ABSTRACT

The invention relates to a device for monitoring strain or deformation within rock boreholes in three-dimension. The device comprises in general a vibrating wire strain monitor for monitoring strain or deformation in an axial direction with respect to the borehole axis interposed between two other vibrating wire string monitors which monitor strain or deformation in radial directions with respect to the borehole axis. The radial vibrating wire strain monitors each have elements by which they may be anchored within a borehole. Together, the three vibrating wire strain monitors monitor strain or deformation in three orthogonal directions within a borehole. The combination allows the axial vibrating wire strain monitor to utilize the radial vibrating wire strain monitor's anchors thereby eliminating their requirement to provide separate anchoring means therefor.

20 Claims, 1 Drawing Sheet

THREE-DIMENSIONAL STRAIN MONITOR FOR ROCK BOREHOLES

FIELD OF THE INVENTION

The invention relates to a three-dimensional strain monitor for monitoring strain or deformation within rock boreholes.

BACKGROUND

The use of vibrating wire technology is known per se in the measurement instrument industry. The theory behind such technology is that a taut wire which has been made to vibrate resonates at a frequency which is a function of, among other things, the tension applied to the wire. If the wire is pre-tensioned, then a load applied generally axially with respect to the wire changes the tension on the wire and thus its resonating frequency. If the resulting frequency is measured, then the magnitude of load applied may be calculated theoretically therefrom or may be derived therefrom using known calibration techniques. As will be recognized by those skilled in the art, this measurement technique is readily adaptable for use in measuring strain or deformation.

Vibrating wire strain or deformation measurement technology has been found to be advantageous over conventional strain or deformation monitoring technology such as the use of metal foil gauges or mechanical extensometers. Metal foil strain gauge transducers are not recoverable once they are in place and they suffer from problems of creep due to thermal expansion and of drift during long term monitoring because the epoxy bond is subject to moisture absorption and shrinkage. In addition, the resistance of the read-out cable, which varies with length, directly affects signal output. With mechanical extensometers, increased accuracy tends to result in increased costs of manufacture, so it is difficult to attain a high level of accuracy without substantial expenditure. Additionally, extensometers typically require long base lengths to record deformation in the elastic range. These long base lengths tend to average out significant deformation gradients and thus their importance. Vibrating wire strain monitors on the other hand are relatively inexpensive to produce and they exhibit highly accurate results. For more information with respect to the principles of operation of vibrating wire strain monitors, reference may be made to applicant's U.S. Pat. No. 4,858,472 issued Aug. 22, 1989 or applicant's pending U.S. patent application Ser. No. 07/426,072 filed Oct. 23, 1989, now U.S. Pat. No. 5,048,344.

Heretofore, various strain monitoring/measuring devices have been proposed, among these are applicant's above-referenced patents. However, these devices have been directed primarily to the uni-directional measurement of strain or deformation. Since the deformation which occurs within rock typically does so in three dimensions, it would be useful to have a single integral device capable of precise strain or deformation monitoring also in three dimensions.

PRIOR ART

U.S. Pat. No. 4,813,278, issued Mar. 21, 1989 to Kosugi describes a method and apparatus for the determination of three-dimensional stresses within rock. However, since the apparatus measures displacements, it is essentially a three-dimensional strain monitor. The apparatus measures displacements within a hemispherically-bottomed borehole in at least six different directions in order to determine the three-dimensional stress state of underground rock. The components of the apparatus which are used in the displacement measurements are elaborate. Six contact elements are employed, each being operatively connected by flexible connection means to a linear variable displacement transformer which produces a signal representative of the displacement. Coupled with the requirement for high accuracy, such a sophisticated arrangement of electro-mechanical transducers lends itself to high manufacturing and maintenance costs. An additional problem is that special attention must be paid in the preparation of the borehole, i.e. the bottom thereof must be formed substantially hemispherically, requiring specialized boring equipment and adding to the overall implementation time and costs.

SUMMARY OF THE INVENTION

The present invention overcomes the aforementioned drawbacks and fills a niche within the industry by providing a relatively inexpensive but extremely accurate, recoverable, three-dimensional strain monitor for monitoring strain or deformation within boreholes. The present invention is particularly useful in a monitoring and analysis of ground reaction to mining or other excavation activity in the elastic range. In general, the present invention provides a uniquely-designed vibrating wire strain monitor for monitoring strain in an axial direction with respect to the borehole axis which may be used in conjunction with available vibrating wire strain monitors which are capable of monitoring strain in radial directions with respect to the borehole axis. The axial vibrating wire strain monitor is disposed between the two radial vibrating wire strain monitors and uses the radial vibrating wire strain monitors' anchoring means as a means by which axial strain or deformation of the borehole is translated to the axial vibrating wire strain monitor.

Accordingly, there is provided in one aspect of the invention a strain monitor for monitoring strain or deformation in a borehole which comprises a first vibrating wire strain monitor and a second vibrating wire strain monitor each for monitoring strain or deformation in first and second radial directions with respect to the borehole axis. The first and second vibrating wire strain monitors each have means by which they can be mounted within a borehole. The strain monitor further comprises a third vibrating wire strain monitor disposed between the first and second vibrating wire strain monitors for monitoring strain or deformation in an axial direction with respect to the borehole axis. The first and second vibrating wire strain monitors act as anchors for the third vibrating wire strain monitor. Preferably, the third vibrating wire strain monitor comprises a substantially C-shaped yoke having a web portion extending generally axially with respect to the borehole axis and two flange portions extending generally perpendicular to the web. A taut wire extends between the two flanges, substantially parallel to the borehole axis. Located adjacent the wire is an electromagnetic transducer which can cause the wire to vibrate and can detect the resulting frequency of vibration thereof. Preferably, the third vibrating wire strain monitor is attached to a structure which houses the first and second radial vibrating wire strain monitors by means of two arms which project outwardly from the flanges of the yoke and which are affixed rigidly to the housings by any conventional means such as bolts.

The robust design of the yoke is such that it gives an overall structural integrity to the monitoring device, yet is sufficiently sensitive to ensure highly accurate results are obtained. Its open design lends itself to being easily manufactured and readily connectable to a wide variety of commercially available vibrating wire strain monitors for radial strain or deformation monitoring.

Further features and advantages of the present invention will become more apparent from the following detailed description and accompanying drawings.

DETAILED DESCRIPTION OF THE PREFERRED EMBODIMENT

Figure 1:
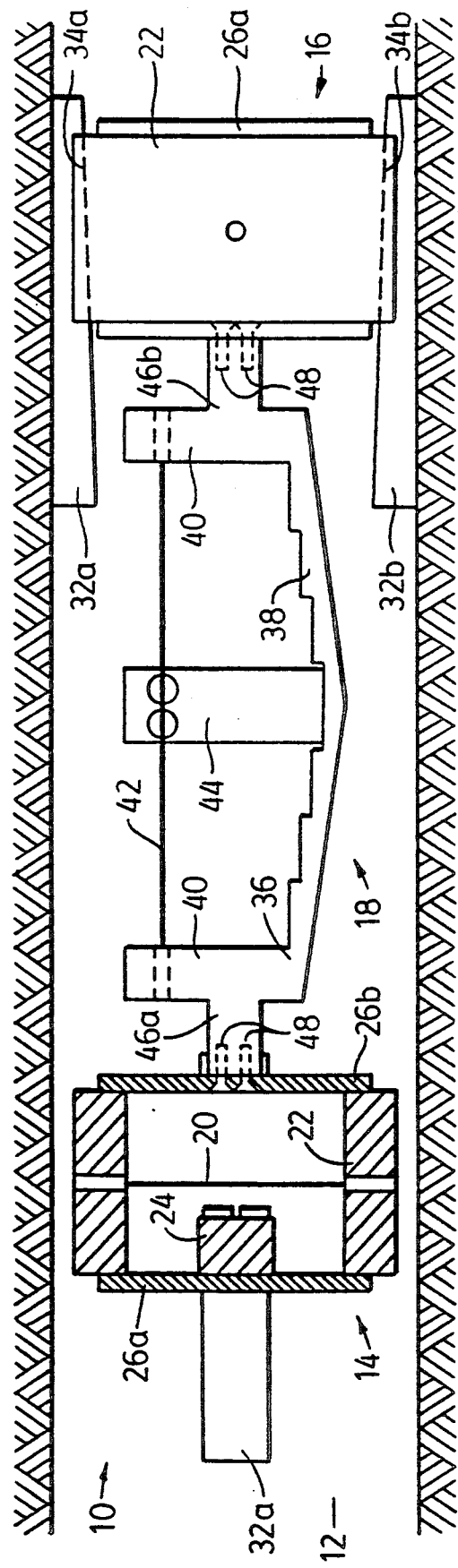
FIG. 1 is a partial cross-sectional view of the three-dimensional strain monitor according to the preferred embodiment.

Referring now to FIG. 1, there is shown generally at 10 the preferred embodiment of the three-dimensional strain monitor disposed within borehole 12. The monitor 10 comprises, in general, first and second vibrating wire strain monitors 14,16 interconnected by a third vibrating wire strain monitor 18. The first and second vibrating wire strain monitors 14,16 are used to monitor strain or deformation in first and second radial directions with respect to the borehole axis, these first and second radial directions being disposed at 90° relative to one another. The third vibrating wire strain monitor 18 is used to monitor strain or deformation in a direction generally parallel with the borehole axis. Together, the three vibrating wire strain monitors 14,16,18 monitor strain or deformation within borehole 12 in three orthogonal directions.

The first and second vibrating wire strain monitors are preferably, but not necessarily, of the type having a taut wire 20 extending across a chord or the diameter of an annular proving ring 22. The wire 20 is secured at its ends using known techniques. An electromagnetic transducer 24 is mounted on the inner face of cover plate 26a, approximately adjacent the wire 20. Cover plate 26a in held in place at one end of the aperture of the proving ring by means of a flexible O-ring and is secured by screws (not shown). Preferably, the transducer 24 is a magnetically coupled variable frequency oscillator which is connected to a remote readout unit (not shown). The principle of operation of the transducer 24 is well known. Basically, the transducer 24 emits electromagnetic pulses which cause the wire 20 to vibrate at a frequency which is a function of its tightness and this vibration is then detected by the transducer 24. The resulting frequency of vibration can be correlated with a calibration curve, for example, to obtain a corresponding strain reading.

The radial vibrating wire strain monitors 14,16 include means to mount or anchor them within the borehole 12. Preferably, the anchor means comprises a pair of wedges 32a,b having a predetermined taper angle, and a pair of diametrically opposed complementary grooves 34a,b for respectively receiving the wedges 32a,b. The grooves 34a,b extend along the outer surface of the annular proving ring 22 and have a tapered slope angle substantially identical to that of the wedges 32a,b, that angle being about 3° or less. In order to minimize any adverse effect which seating errors might cause when the wire ends are at or near the points of contact of the wedges with the borehole wall, the grooves 34a,b are preferably located on a diameter substantially orthogonal to the chord or diameter along which the wire 20 extends (as shown in FIG. 1).

On the opposite end of proving ring 22 is a second cover plate 26b which is attached to the ring 22 in a similar manner as cover plate 26a. Together, the cover plates 26a,b and the annular proving ring 22 form a housing for the radial vibrating wire strain monitor.

Disposed between the housing of the two radial vibrating wire strain monitors 14,16 is a third vibrating wire strain monitor 18. The third vibrating wire strain monitor 18 comprises a generally C-shaped yoke 36 having a web portion 38 and two flange portions 40. A taut wire 42 extends between the flanges 40, substantially parallel to the borehole axis, the ends of the wire being secured using known techniques. Another magnetically coupled variable frequency oscillator or transducer 44 is positioned approximately adjacent the wire 42 for oscillating the wire 42 and detecting its resultant frequency of vibration. Preferably, the transducer extends from a portion of the yoke 36, such as the web portion 38 as shown in the drawing or from either of the flange portions 40. In the preferred embodiment shown in FIG. 1, the web portion 38 is shown to be angled slightly outwardly from the flange portions 40. The angling is effected to ensure that elastic deformation in the yoke 36 takes place primarily in the central portion of the web 38. The inner edge of the web 38 may also be stepped since it is easier to machine than an angled edge. The yoke 36 is preferably mounted between the housings of the radial vibrating wire strain monitors 14,16 by two arms 46a,b which extend outwardly from the yoke 36 and in a direction substantially parallel to, and preferably commensurate with, the borehole axis. The arms 46a,b are rigidly attached, such as by screws 48, to the respective cover plates 26b of the radial vibrating wire strain monitors 14,16. The general configuration of the third vibrating wire strain monitor 18 is such that it may be easily machined, gives an overall structural integrity to the three-dimensional strain monitor 10 and, more importantly, allows it to take advantage of the radial vibrating wire strain monitors' anchoring means. Thus, the axial vibrating wire strain monitor 18 is indirectly in contact with the walls of borehole 12 via the radial vibrating wire strain monitors 14,16 and their respective anchoring means.

When the rock formation within which the borehole is made deforms, so does the shape of the borehole. Radial deformation of the borehole causes the tension on the wires 20 of the radial vibrating wire strain monitors 14,16 to increase or decrease which results in a corresponding increase or decrease of their frequencies of vibration. Deformation of the borehole in an axial direction results in the relative distance between the points of contact of the wedges 32a,b of the radial strain monitor 14 and the wedges 32a,b of the radial strain monitor 16 being increased or decreased, hence producing a corresponding increase or decrease in the frequency of vibration of the wire 42 of the axial strain monitor 18.

The three-dimensional strain monitor 10 is assembled and calibrated prior to installation. During manufacture and/or assembly, care is taken to ensure the orthogonality of the three monitoring directions. That is to say that, in the preferred embodiment, the three vibrating wire strain monitors 14,16,18 are assembled in such a manner that the three vibrating wires 20,42 are as close to being orthogonal as possible or as economically feasible. With proper care in handling, the three-dimensional strain monitor 10 should not require any further adjustment with respect to the orthogonality of the monitoring directions either prior to, or during installation. However, recalibration of the device 10 and realignment of the monitoring directions may be required between installations.

Installation of the three-dimensional strain monitor 10 is relatively straightforward. A suitable installation/retrieval instrument (similar to the one shown in the aforementioned Canadian Patent No. 1,240,851) can be devised which, when manipulated, brings the wedge pairs 32 into bearing contact with the grooves 34 of the radial strain monitors 14,16. The instrument holds the monitor 10 in position at a predetermined depth within the borehole 12 while the wedge pairs 32 are moved, either simultaneously or successively, relative to the respective proving rings 22 until the borehole diameter is attained. The wedge pairs 32 are then forced further along their respective grooves 34 in order to apply the desired seating pressure to the proving rings 22 and, hence, the vibrating wires 20. This results in the radial vibrating strain monitors 14,16 being anchored firmly within borehole 12 with the axial vibrating wire strain monitor 18 rigidly affixed therebetween. Retrieval of the three-dimensional strain monitor 10 is achieved in a similar, but opposite manner. If the three vibrating wire strain monitors 14,16,18 are connected to the remote readout unit, then the amount of seating pressure applied can be observed during installation. The remote readout unit, which is essentially a self-contained frequency meter, outputs the resulting frequency of vibration of the vibrating wires 20,42. The associated strain is derived by comparing these frequencies with calibration curves. Alternately, the readout unit may be programmed to convert the frequencies directly into strain readings. The readout unit may be readily disconnectable when intermittent readings only are required or may be coupled with a recording device to permit continuous monitoring or if deformation gradient information is required.

Although the three-dimensional strain monitor 10 of the present invention is capable of measuring strain in three directions, it will be recognized by those skilled in the art that two such devices, installed in two properly oriented boreholes, would be required to yield a complete strain analysis.

Although there has been shown and described herein the preferred embodiment of a three-dimensional borehole strain monitor according to the present invention, it will be understood that various modifications or substitutions may be made thereto without departing from the spirit and scope of the claims as defined in the appended claims.

The embodiments of the invention in which an exclusive property or privilege is claimed are defined as follows:

1. A strain monitor for monitoring strain or deformation in a borehole comprising:
    first and second vibrating wire strain monitors for monitoring strain or deformation in first and second radial directions with respect to the borehole axis, said first and second vibrating wire strain monitors each including means for anchoring itself within a borehole; and
    a third vibrating wire strain monitor disposed between said first and second vibrating wire strain monitors for monitoring strain or deformation in an axial direction with respect to the borehole axis, wherein said first and second vibrating wire strain monitors act as anchors for said third vibrating wire strain monitor.

2. A strain monitor as claimed in claim 1, wherein said third vibrating wire strain monitor comprises:
    a generally C-shaped yoke having a web and two flanges;
    means for attaching said yoke to said first and second vibrating wire strain monitors;
    a taut wire extending between said flanges and substantially parallel with said borehole axis; and
    electromagnetic transducer means positioned adjacent said wire for causing said wire to vibrate and for detecting its frequency of vibration, said frequency of vibration being dependent upon movement transmitted to the wire via said first and second vibrating wire strain monitors.

3. A strain monitor as claimed in claim 2, wherein said means for attaching said yoke to said first and second vibrating wire strain monitors comprises an arm extending axially outwardly from each of said flanges, said arms being connectable to a portion of said first and second vibrating wire strain monitors by connection means such as screws.

4. A strain monitor as claimed in claim 3, wherein said arms lie substantially along said borehole axis.

5. A strain monitor as claimed in claim 2, wherein said web is spaced from said borehole axis approximately a same distance as is said wire.

6. A strain monitor as claimed in claim 2, wherein said electromagnetic transducer means is mounted on said yoke.

7. A strain monitor as claimed in claim 6, wherein said electromagnetic transducer means extends from said web.

8. A strain monitor as claimed in claim 6, wherein said electromagnetic transducer means extends from one of said flanges.

9. A strain monitor as claimed in claim 1, wherein said first and second vibrating wire strain monitors are of the type comprising:
    a cylindrical proving ring having an axially extending bore;
    a taut wire extending across said bore; and
    an electromagnetic transducer means positioned adjacent the wire for causing the wire to vibrate and for determining its frequency of vibration, said frequency of vibration being dependent upon movement transmitted to the wire via the proving ring.

10. A strain monitor as claimed in claim 9, wherein said wires of said first and second vibrating wire strain monitors extend across a diameter or chord of said proving ring.

11. In a device for monitoring strain or deformation within rock boreholes, a vibrating wire strain monitor for monitoring strain or deformation in an axial direction with respect to the borehole axis for use with two vibrating wire strain monitors each capable of monitoring strain or deformation in a radial direction with respect to the borehole axis, said axial vibrating wire strain monitor being disposed between said two radial vibrating wire strain monitors such that the three vibrating wire strain monitors are capable of monitoring strain or deformation within a borehole in three orthogonal directions, said two radial vibrating strain monitors each comprising means by which they may be anchored within a borehole whereby said two radial vibrating wire strain monitors act as anchors for said axial vibrating wire strain monitor.

12. A strain monitoring device as claimed in claim 11, wherein said axial vibrating wire strain monitor comprises:
   a generally C-shaped yoke having a web and two flanges;
   means for attaching said yoke to said radial vibrating wire strain monitors;
   a taut wire extending between said flanges and substantially parallel with said borehole axis; and
   electromagnetic transducer means positioned adjacent said wire for causing said wire to vibrate and for detecting its frequency of vibration, said frequency of vibration being dependent upon movement transmitted to the wire via said radial vibrating wire strain monitors.

13. A strain monitoring device as claimed in claim 12, wherein said means for attaching said yoke to said radial vibrating wire strain monitors comprises an arm extending axially outwardly from each of said flanges, said arms being connectable to a portion of said radial vibrating wire strain monitors by connection means such as screws.

14. A strain monitoring device as claimed in claim 13, wherein said arms lie substantially along said borehole axis.

15. A strain monitoring device as claimed in claim 12, wherein said web is spaced from said borehole axis approximately a same distance as is said wire.

16. A strain monitor as claimed in claim 12, wherein said electromagnetic transducer means is mounted on said yoke.

17. A strain monitor as claimed in claim 16, wherein said electromagnetic transducer means extends from said web.

18. A strain monitor as claimed in claim 16, wherein said electromagnetic transducer means extends from one of said flanges.

19. A strain monitoring device as claimed in claim 11, wherein said radial vibrating wire strain monitors are of the type comprising:
   a cylindrical proving ring having an axially extending bore;
   a taut wire extending across said bore; and
   an electromagnetic transducer means positioned adjacent the wire for causing the wire to vibrate and for determining its frequency of vibration, said frequency of vibration being dependent upon movement transmitted to the wire via the proving ring.

20. A strain monitoring device as claimed in claim 19, wherein said wires of said radial vibrating wire strain monitors extend across a diameter or chord of said proving ring.

* * * * *